United States Patent [19]

Bourns

[11] 3,969,535

[45] July 13, 1976

[54] POPCORN PACKAGE

[75] Inventor: George B. Bourns, La Porte, Ind.

[73] Assignee: American Home Products Corporation, New York, N.Y.

[22] Filed: Jan. 4, 1974

[21] Appl. No.: 430,866

[52] U.S. Cl. .............................. 426/111; 99/323.5
[51] Int. Cl.² .......................................... A23L 1/18
[58] Field of Search ..................... 99/323.5, 323.4; 426/110, 118, 112, 395, 111

[56] References Cited
UNITED STATES PATENTS

| | | | |
|---|---|---|---|
| 2,673,806 | 3/1954 | Colman | 426/110 |
| 2,791,350 | 5/1957 | Mennen | 220/67 |
| 2,815,883 | 12/1957 | Robins et al. | 220/66 |
| 2,819,976 | 1/1958 | Hines | 426/111 |
| 3,054,680 | 9/1962 | Mennen | 426/111 |
| 3,244,356 | 4/1966 | Wolowicz et al. | 229/51 TS |
| 3,425,845 | 2/1969 | Dunn | 426/111 |
| 3,519,439 | 7/1970 | Dunn | 426/111 |
| 3,671,270 | 8/1970 | Jehn | 426/111 |

FOREIGN PATENTS OR APPLICATIONS 720,260   10/1965   Canada .............................. 426/118

Primary Examiner—Leonard D. Christian
Assistant Examiner—Donald B. Massenberg
Attorney, Agent, or Firm—Joseph Martin Weigman

[57] ABSTRACT

The disclosure is directed to an improved popcorn package made of a metal foil pan closed by an expansible, clear plastic cover, and an annular gasket disposed adjacent the cover. The gasket has a plurality of fingers adhesively connected to the expansible plastic cover and adapted to support it during expansion.

6 Claims, 5 Drawing Figures

U.S. Patent    July 13, 1976    Sheet 1 of 2    3,969,535
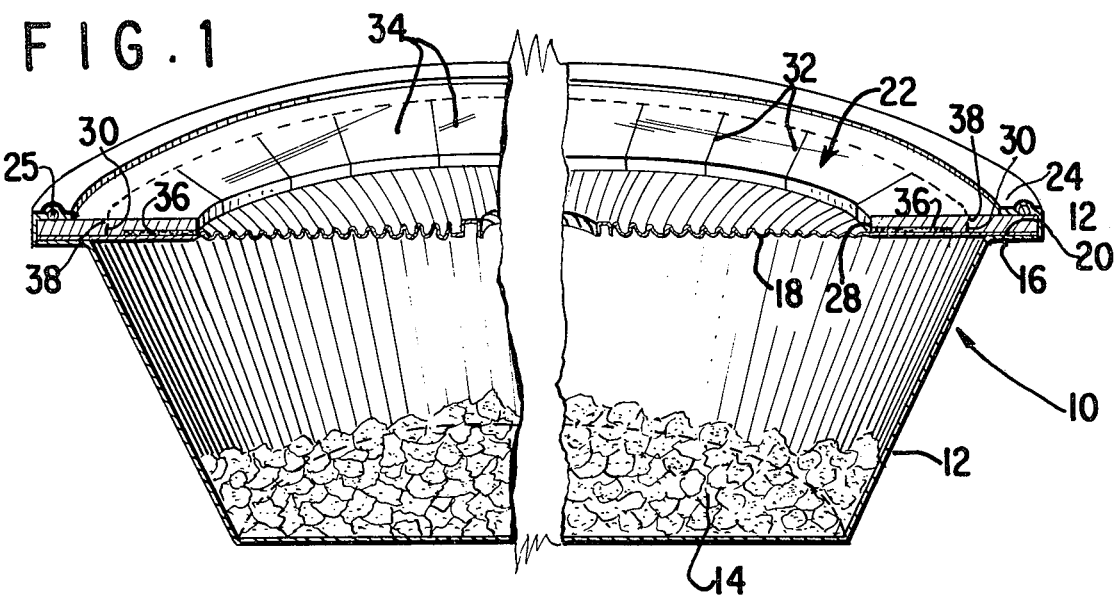
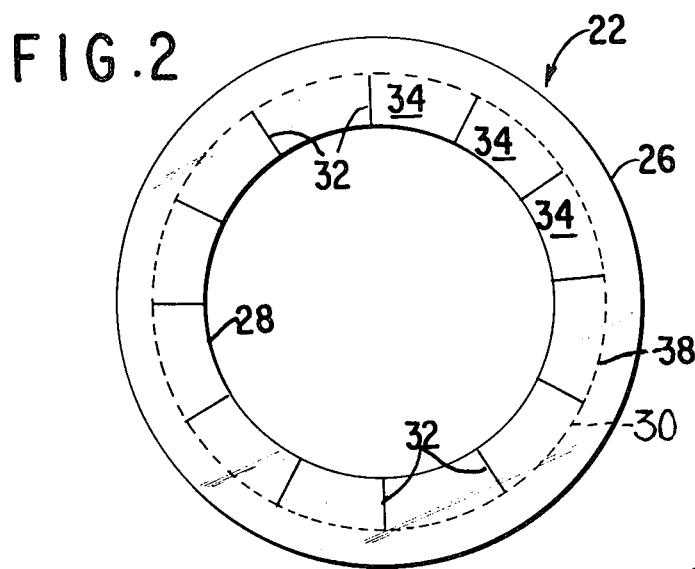
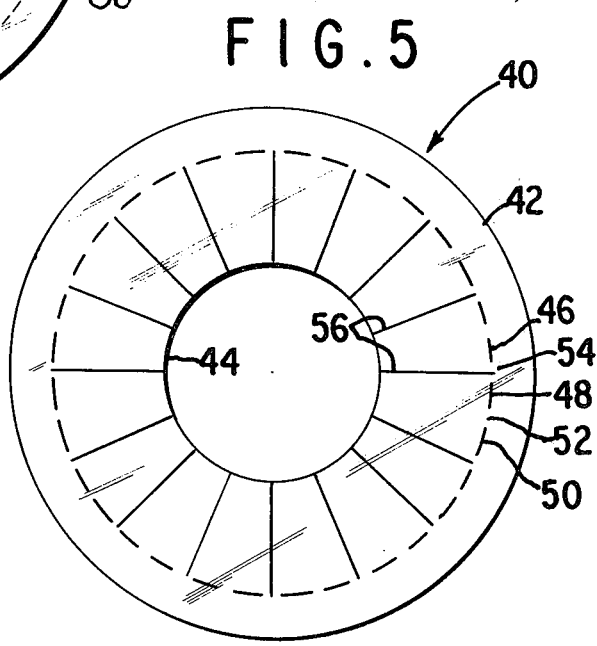

POPCORN PACKAGE

The present invention relates to packages for food in which the food may be heated or finally prepared prior to removal from the package by applying heat directly to the package. More particularly the invention relates to an improved popcorn package having a poppable popcorn composition contained in a metal foil pan which is closed by an expansible clear plastic cover. The improvement comprises a gasket of particular configuration disposed adjacent the plastic cover to support the plastic cover during expansion to prevent tearing.

Packages for containing popcorn compositions during storage and merchandising and which are then used for popping the popcorn prior to consumption are known in the prior art. In general, these comprised a metal foil pan, usually aluminum, which had an expansible cover attached to it, usually by crimping the edges of the foil pan. The cover was usually aluminum foil frequently of a swirled construction so as to enable it to expand in response to the internal pressures generated by vaporizing the water contained in compositions during heating. However, aluminum foil covers were subject to pinholes and small breaks in the foil which destroyed the hermetic seal and led to the drying of the contents during extended storage. Also the aluminum foil covers prevented observation of the contents during the heating.

The covers were also formed of other materials such as plastic, which while stronger and more resistant to pinholes and cracks than aluminum foil, introduced other problems. The plastic covers, as they expanded, tended to separate at the outer periphery adjacent to the metal pan due to the concentration of the elongation stresses and heat causing melting (especially when popped on gas stoves.)

A number of patents have been issued relating to packages for popping corn including U.S. Pat. Nos. 2,673,806 and 3,671,270. The most closely related prior art is believed to be U.S. Pat. No. 3,244,356 which is directed to a tray cover construction and makes use of a generally circular paperboard disk marginally connected to the edge portions of a shallow tray containing expandable food material held within an expandable foil liner. The central section of the disk is scored for removal prior to heating leaving a peripheral annulus of the paperboard. There is no teaching or suggestion of connecting the disk to the liner to support the liner during expansion.

U.S. Pat. No. 2,815,883 shows a spirally wound cover for popcorn containers which is formed from aluminum foil covers which are spirally wound or "swirled" are useful in the practice of the present invention.

It is an object of the present invention to provide an expansible popcorn package in which a clear plastic cover is protected from destruction during the heating process.

It is a further object of the present invention to provide a popcorn package in which an expansible plastic cover is supported at its periphery during expansion thus preventing separation of the cover during expansion.

It is a further object of the present invention to provide a popcorn package in which an expansible clear plastic cover is insulated from the heat applied to and conducted by the metal pan.

Other and further objects of the invention will be apparent to those skilled in the art from reading the following description in conjunction with the drawings in which:

FIG. 1 is a partial sectional view of a package incorporating the preferred embodiment of the present invention;

FIG. 2 is a plan view of a gasket of the present invention;

FIG. 5 is a plan view of an alternate gasket embodiment.

Figure 3:
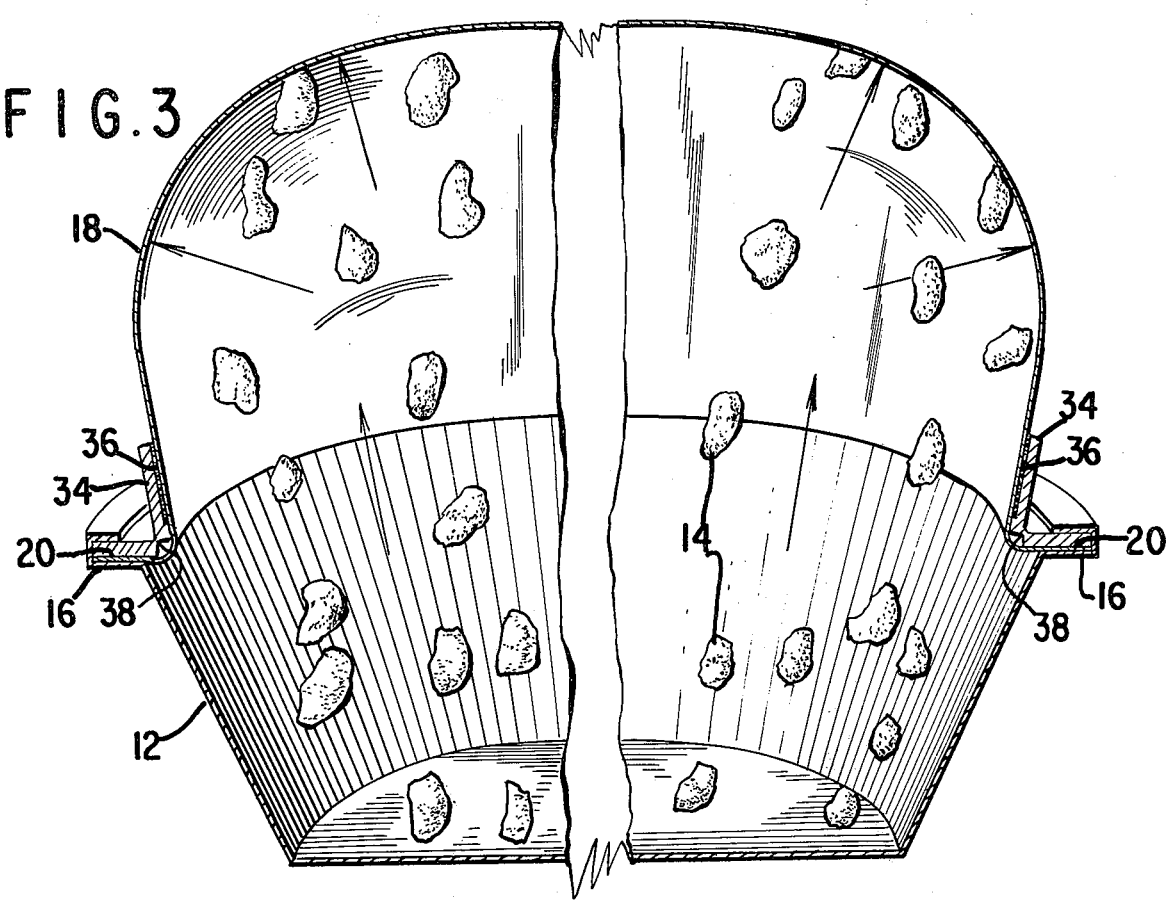
FIG. 3 is a partial sectional view through the package after the cover has expanded.

The present invention will be described with regard to packages for popcorn in which a popcorn and frying fat composition is prepared for consumption by heating in the package. However, it is to be understood that the invention may be used with any container in which heat is used to cook or expand a product. Such other products include puffable snacks, bread and the like. The present invention can be used where it is desirable to watch response to heat under low pressure. Typically the pressure in packages of the present invention is enough above atmospheric to promote full expansion of swirled covers — either foil or plastic.

The objects of the present invention may be achieved in a popcorn package in which a metal pan, typically aluminum foil, contains a composition of poppable corn dispersed in cooking fat and other materials in which the corn may be heated to cause expansion, or popping, and may also be flavored or colored at the same time. An expandable cover, or bonnet is attached over the pan, typically by crimping the edges of the foil pan over the cover.

The cover may be made of any stretchable plastic which meets the approval of the Food and Drug Administration. It is preferred that the cover be spirally wound or swirled. A transparent plastic permits the progress of popping to be viewed during the heating process and is especially advantageous. Preferably, the plastic has "memory" so that once the swirl is set at elevated temperature, the plastic tends to retain the swirled position assuring a tight, attractive package. The plastic is preferably one mil or less in thickness so that it will expand under pressure. The plastic preferably resists heat up to 460° F.

If desired, a wire handle may be applied which typically is a substantially circular piece of wire having a radially extended portion. The circular segment is substantially coextensive with the rim of the metal pan and is connected to it by crimping the metal foil rim over the wire. The radially extended portion serves as a handle.

The objects of the present invention may be achieved by disposing an annular gasket adjacent the plastic cover prior to crimping the metal pan; the gasket may be on either side of the plastic, relative to the pan but preferably on top. The outer periphery of the annular gasket is substantially coextensive with the rim of the pan so as to be firmly connected to it by the crimping process. The inner diameter of the annular gasket is sufficiently large to provide a clear view of the contents through the transparent plastic cover. The annular gasket is preferably formed of light paperboard, but other materials may be used as will be apparent to those skilled in the art.

The annular gasket has an annular score between its inner diameter and its outer diameter. The diameter of the annular score is substantially less than that of the rim of the metal pan so as not to interfere with the crimping operation. The annular score may be on the bottom surface of the assembled gasket and extend partly through the gasket. Preferably the score is intermittent, cut through with small uncut portions holding fingers to the rest of the gasket. A plurality of radial scores extend completely through the gasket from its inner diameter to the annular score. The radial scores define an equal number of tapered segments, or fingers, which are adapted to bend around a hinge defined by the radial score. The radial scores are preferably twelve in number, although more may be used.

In a typical package the pan has a diameter of about 6 inches. The fingers are ½ to 2 ½ inches long, preferably about 2 inches long.

Each of the fingers is attached to the adjacent plastic surface by an adhesive. The adhesive is preferably applied on the finger so as to leave a clear area around the periphery of the finger. The clear areas prevent adjacent fingers from being inadvertently joined together by the adhesive. Also, care is taken that the adhesive does not extend into the folds of the cover formed by the spiral winding. The adhesive may be any heat resistant type which is approved for use with foods and has a high melting point, preferably above 250°F. A typical adhesive is a water base, formulated resin emulsion which sets to a tough flexible film. A specific example is the glue supplied by the National Starch and Chemical Corp. and identified as 76-6323.

As may be seen in FIGS. 1 and 2 the popcorn package 10 is made up of a foil pan 12 which contains the expansible product 14. The pan 12 has an upper horizontal flange 16. A cover 18 closes the pan and has its outer edges 20 coextensive with the horizontal flange 16. A gasket 22 is placed on top of the cover 18. The gasket 22 cover 18 and pan 12 are joined together by a crimp 24 formed in the outer periphery of the flange. A wire handle 25 may be provided if desired.

The gasket 22 is preferably an annulus having an outer diameter 26, which is coextensive with the horizontal flange 16 of the pan, and an inner diameter 28 of a size sufficient to permit visual observation of the contents through the cover 18 during heating.

An annular score 30 is located in the gasket 22 between the inner edge 28 and outer edge 26 and is preferably of a diameter about the same as the interior diameter of the horizontal flange 16 of the pan 12. A plurality of radial scores 32 extend from the inner edge 28 to the annular score 30 and define a plurality of fingers 34. It has been found desirable that at least 12 fingers be formed although a larger or smaller number may be used. Each of the fingers 34 is connected by a layer 36 of adhesive to the adjacent surface of the cover 18.

As may be seen in FIG. 3, after heat has been applied to the pan 12, internal forces, typically steam pressure, cause the plastic cover 18 to expand. As the cover expands the fingers 34 bend about the hinges 38 permitting further expansion but supporting the cover during expansion and so preventing the cover from tearing or otherwise rupturing. The outer edge 20 of the plastic cover 18 may melt, but the seal is retained by the gasket.

Figure 4:
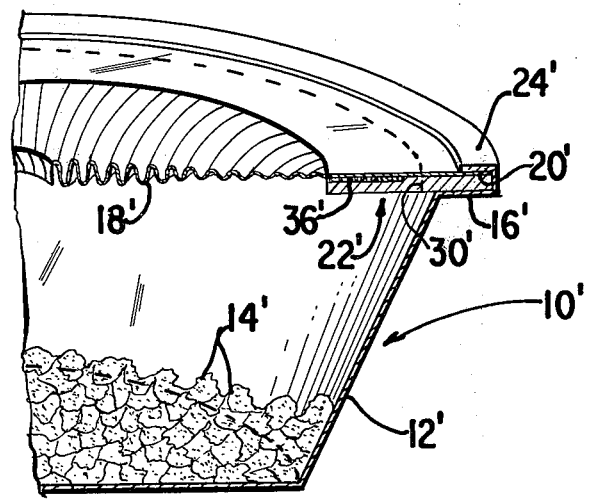
FIG. 4 is a partial sectional view of an alternate embodiment of the present invention.

An alternate embodiment in which the gasket is located between the cover and the pan is shown in FIG. 4. There the popcorn package 10' is made up of a foil pan 12' which contains the expandable product 14'. The pan 12' has an upper flange 16'. A cover 18' closes the pan and has its outer edges 20' coextensive with the flange 16'. A gasket 22' is placed between the cover 18' and the pan 12'. The gasket cover 18' and pan 12' are joined together by a crimp 24' formed in the outer periphery of the flange.

An especially advantageous gasket embodiment is shown in FIG. 5. The gasket when scored as shown holds the plastic cover from the proximity of the flame which otherwise may lick up around the pan edges and melt through the plastic. The advantage of the embodiment is that the long, cut-through sections and scores on uncut board allow the fingers to rise easily at first until they are almost vertical but to resist further bending which holds the expanded cover away from the flame.

As can be seen in FIG. 5, the gasket 40 is an annulus having an outer edge 42 and an inner edge 44. An intermittent radial score 46 is located in the gasket 40 between the inner edge 44 and the outer edge 42. Each of the score elements 48 extends through the gasket and is spaced apart from an adjacent score element 50 by an unscored portion 52. The radial scores and the annular score elements are arranged relative to each other so that an unscored portion 54 occurs at the end of each of the radial scores 56.

What is claimed is:

1. A package for storing and preparing an expansible food stuff comprising in combination:
   A. A cooking pan;
   B. A food stuff disposed in said pan;
   C. An expansible cover closing the upper surface of said pan;
   D. A gasket disposed adjacent to said cover;
     1. Said gasket further comprising an annulus, the outer surface of said annulus being substantially coextensive with the outer surface of said pan and said cover; the inner diameter of said annulus being substantially smaller than the outer diameter of said pan;
     2. An annular score formed in said gasket between said inner diameter and said outer diameter and extending partly through said gasket from the pan side;
     3. A plurality of straight scores extending from the inner diameter of said gasket to said annular score completely through said gasket material and defining a plurality of fingers which are adaptable to flex about a hinge defined by segments of said annular score;
     4. Each of said fingers being adhesively connected to the adjacent surface of the cover;
   E. Said pan, gasket and cover being held together by crimping the edges of said cooking pan, whereby the integrity of said expansible cover is maintained, retaining steam generated during heating and improving the degree and extent of expansion of the expansible food stuff.

2. The package improvement described in claim 1 wherein said annular score extends partly through said gasket from the pan side.

3. A package as defined in claim 1 wherein said cover is between said pan and said gasket.

4. A package as defined in claim 1 wherein said gasket is between said cover and said pan.

5. The package improvement described in claim 1 in which said annular score is comprised of intermittent perforations extending completely through the gasket.

6. The package improvement defined in claim 3 wherein said annular score elements are located relative to said radial scores so that the scores do not intersect.

* * * * *